Patented Dec. 3, 1940

2,223,373

UNITED STATES PATENT OFFICE 2,223,373

COMPOUNDS OF THE ISOQUINOLINE SERIES

Fritz Kulz and Carl August Hornung, Frankfort-on-the-Main, Germany

No Drawing. Application December 13, 1937, Serial No. 179,610. In Germany December 22, 1936

8 Claims. (Cl. 260—289)

This invention relates to new compounds of the isoquinoline series adapted for use as medicines and to a process for preparing the same.

The aforesaid compounds are characterised in that they contain in the nitrogen-containing nucleus an aralkyl group or aralkylene group and in one of the aromatic nuclei two free hydroxyl groups, preferably in the ortho position to one another, or more than two free hydroxyl groups, but in the other nuclei contain no free or esterified or etherified hydroxyl groups. Other substituents, e. g., hydrocarbon groups, such as alkyl or alkylene groups or further aralkyl or aralkylene groups may be present at the carbon atoms or at the nitrogen atom in the aromatic nucleus containing the hydroxyl groups as well as in the other aromatic nucleus or further aromatic nuclei and also in the nitrogen-containing nucleus.

The aliphatic part of the aralkyl group or groups present may consist of a methylene group or of a chain formed only of two or more methylene groups or may be substituted in one or more methylene groups, for example by alkyl, alkylene, aralkyl or aralkylene groups. Any aralkylene groups present may also contain in the aliphatic part more than one double bond and may be substituted in the methylene and methenyl groups (methine groups) present, for example by any desired hydrocarbon groups.

The new compounds of this invention may be completely or partially hydrogenated in the nitrogen-containing nucleus. The terms isoquinoline compounds or compounds of the isoquinoline series as used in the description and claims accordingly include both compounds which are not hydrogenated in the nitrogen-containing nucleus and also compounds which are partially or completely hydrogenated in the nitrogen-containing nucleus.

The new compounds of this invention as compared with the known spasmolytically acting isoquinoline compounds substituted by aralkyl groups and in some cases also by etherified hydroxyl groups as well, such as papaverine (tetramethoxy-1-benzyl-isoquinoline), and the corresponding hydrogenated compounds, which, as is known, predominantly exert a purely peripheral effect on the smooth muscles, are characterised in that they act on the central nervous system and in particular possess emetic and analgesic properties. Depending on the nature of the particular compound one or other of the aforesaid properties may predominate.

The non-hydrogenated or only partially hydrogenated compounds of the aforesaid kind, in addition to being used as medicines, may also be employed for the preparation of the corresponding partially or completely hydrogenated, occasionally more active, compounds.

The salts or salt-like compounds of the hereinbefore described compounds of this invention, for example with hydrogen halides or sulphuric acid or with organic acids, are also included within the ambit of this invention.

The new compounds of this invention may for example be prepared as follows:

In an isoquinoline compound, which in the nitrogen-containing nucleus is di-hydrogenated or tetra-hydrogenated or not hydrogenated and is substituted by an arylkyl or aralkylene group or groups and may if desired be still further substituted and which contains in only one of the aromatic nuclei present at least two partially or completely esterified or etherified hydroxyl groups, preferably in the ortho position to one another, these hydroxyl groups are liberated, for example by known methods.

Alternatively an isoquinoline compound, which is substituted as aforesaid and already contains at least two free hydroxyl groups in only one of the aromatic nuclei and is not hydrogenated or only partially hydrogenated in the nitrogen-containing nucleus, is partially or completely hydrogenated in the nitrogen-containing nucleus.

Alternatively in a non-hydrogenated or partially hydrogenated compound, which is substituted as aforesaid and which contains in only one of the aromatic nuclei at least two partially or completely esterified or etherified hydroxyl groups, these esterified or etherified groups are liberated and the resulting compound containing at least two free hydroxyl groups in one aromatic nucleus, is then partially or completely hydrogenated.

*Examples*

1. 1 gm. of 1-(β-phenylethyl)-6,7-dimethoxy-1,2,3,4-tetrahydro-isoquinoline and 7 ccs. of constant boiling hydrobromic acid are heated to boiling for 1½ hours in a stream of hydrogen. After cooling, the hydrobromic acid is decanted and evaporated under reduced pressure. The residues are combined and, after they have been completely freed from hydrobromic acid, are recrystallised from methanol-ethyl acetate. An almost quantitative yield of a compound having the constitution of 1-(β-phenylethyl)-6,1-dioxy-1,2,3,4-tetrahydro-isoquinoline hydrobromide of the following formula and having a melting point of 193° C. to 194° C. is obtained:

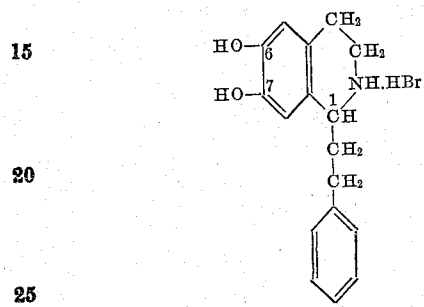

In place of hydrobromic acid other mineral acids, for example hydrochloric acid or hydriodic acid or dilute sulphuric acid may be used. The de-alkylation may also be carried out in another manner, for example with aluminium chloride.

The same compound is obtained by hydrogenating the end product of Example 3, for example with gaseous hydrogen in the presence of a hydrogenating catalyst, such as palladium or platinum.

2. 2 gms. of 1-(β-phenylethyl)-6,7-dimethoxy-2-ethyl-1,2,3,4-tetrahydro-isoquinoline (boiling point 209-210° C. at 2 mms.) are boiled for about 1½ hours with 10 ccs. of constant boiling hydrobromic acid. The product is worked up as indicated in Example 1. The solubility of the salts so far investigated is so great, that these could not hitherto be caused to crystallise. On evaporating down the aqueous solution, e. g., of the hydrobromide, at as low a temperature as possible, only a glass-hard, colourless, lacquer-like residue of 1-(β-phenyl-ethyl)-6,7-dioxy-2-ethyl-1,2,3,4-tetrahydro-isoquinoline hydrobromide of the following formula is obtained:

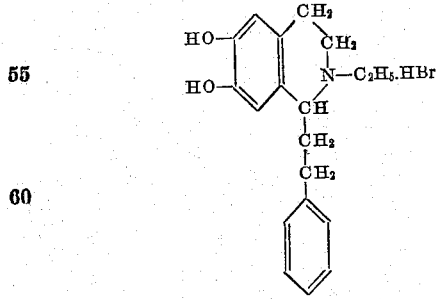

| | Per cent |
|---|---|
| N-content calculated | 3.70 |
| N-content found | 3.83 |

3. 3.3 gms. of 1-(β-phenylethyl)-6,7-dimethoxy-3,4-dihydro-isoquinoline and 20 ccs. of constant boiling hydrobromic acid are heated under reflux for 2 hours to boiling. After removing the hydrobromic acid a quantitative yield of 1-(β-phenylethyl)-6,7-dioxy-3,4-dihydro-isoquinoline hydrobromide of the following formula and having a melting point of 186° C. to 187° C. remains behind:

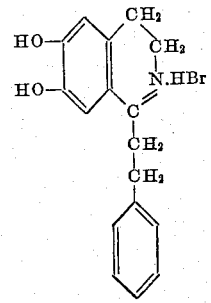

This compound is obtained in like manner by boiling 1-(β-phenylethyl)-6,7-diacetoxy-3,4-dihydro-isoquinoline with hydrobromic acid.

4. In the same manner as in Example 3 there is obtained from 1-[β-(3',4'-dimethoxy-phenyl)-ethyl]-isoquinoline, 1-[β-(3',4'-dioxyphenyl)-ethyl]-isoquinoline hydrobromide of the following formula:

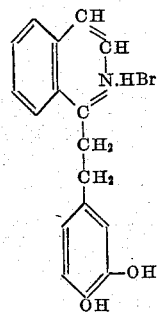

By hydrogenating the above compound the corresponding di- or tetra-hydro-derivatives are obtained.

5. 0.43 gms. of 1-(β-phenylethyl)-6,7-dimethoxy-isoquinoline and 4 ccs. of hydrobromic acid (sp. gr. 1.48) are heated for 2½ hours to gentle boiling in a current of hydrogen. The resulting 1-(β-phenylethyl)-6,7-dioxy-isoquinoline hydrobromide on cooling immediately sets as a crystalline mass. It may be recrystallised from constant boiling hydrobromic acid or methanol-ether and melts at 215° C. (after previous sintering).

Formula:

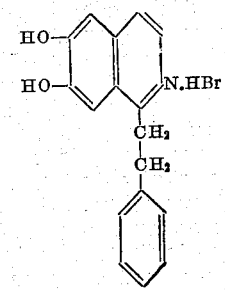

6. 1.5 gms. of 2-(3'4'-dimethoxybenzyl)-1,2,3,4-tetrahydro-isoquinoline are heated with 10.5 ccs. of constant boiling hydrobromic acid for about 2 hours to boiling in a current of hydrogen. The product is worked up in the same manner as described in Example 1. 2-(3'4'-dioxybenzyl)-1,2,3,4-tetrahydro-isoquinoline hydrobromide of the following formula is obtained:

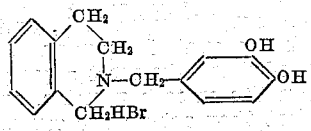

7. 0.75 gms. of 2-[α-methyl-β-(3'-methoxy-4'-oxyphenyl) - ethyl] -1,2,3,4-tetrahydro-isoquinoline and 5 ccs. of constant boiling hydrobromic acid are heated under reflux for 2 hours to boiling in a current of hydrogen. The product is thereafter worked up as in Example 1 and 2-[α-methyl - β - (3'4' - dioxy - phenyl)-ethyl]-1,2,3,4-tetrahydro-isoquinoline hydrobromide of the following formula and having a melting point of 207–208° C. is obtained:

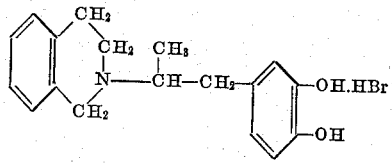

The same compound is also obtained by employing as starting material 2-[α-methyl-(3',4'-dimethoxyphenyl) ethyl]-1,2,3,4-tetrahydro-isoquinoline or 2-[α-methyl-β-(3'4'-methylenedioxyphenyl) ethyl] - 1,2,3,4 - tetrahydro-isoquinoline.

8. In like manner as in Example 7 1-(3', 4'-dioxybenzyl)-1,2,3,4-tetrahydro-isoquinoline hydrobromide of the formula:

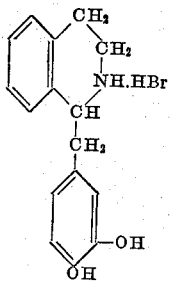

of melting point 217° C. is obtained, for example from the corresponding dialkoxy or alkylenedioxy compounds.

The same compound is also obtained if the benzyl groups are eliminated from 1-(3'4'-dibenzyloxybenzyl) 3,4-dihydro-isoquinoline by catalytically active hydrogen and the double bound is hydrogenated in the pyridine nucleus.

9. 0.35 gm. of 1-methyl-2-(γ-phenylpropyl)-6,7,8-trimethoxy - 1,2,3,4 - tetrahydroisoquinoline hydrochloride (melting point 168–169° C.) and 3 ccs. of colourless hydriodic acid (constant boiling) after adding a small quantity of red phosphorus are heated for 40 minutes to boiling. After complete removal of the hydriodic acid in vacuo 1-methyl-2-(γ-phenyl-propyl)-6,7,8-trioxy-1,2,3,4-tetrahydroisoquinoline hydriodide of the formula:

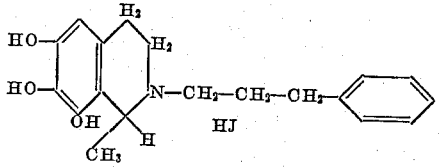

is obtained from acetone and ether in crystals having a melting point of 202–203° C.

10. 1,3-dimethyl-2 - (γ-phenylpropyl) - 6,7,-dioxy-tetrahydroisoquinoline hydriodide of the formula:

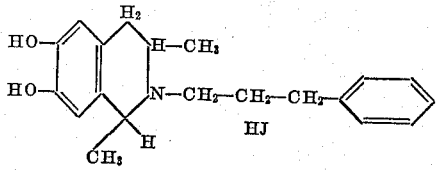

is obtained from 15.4 gms. of 1,3-dimethyl-2-(γ-phenyl - propyl) - 6,7 - dimethoxy-tetrahydroisoquinoline in a manner similar to that described in Example 9 by heating with 60 ccs. of hydriodic acid in a current of carbon dioxide. It crystallises from water or methanol-ether with inclusion of solvent. The corresponding hydrochloride crystallises likewise with inclusion of solvent (acetone). It melts at 137° C. with frothing. It cannot be obtained in a crystalline form free from solvent.

11. 0.35 gm. of 1,3-dimethyl-2-(γ-phenyl-alkyl) -6,7-dimethoxy - 1,2,3,4 - tetrahydroisoquinoline (boiling point 207–210° C. at 3 mms.) and 3 ccs. of colourless constant boiling hydriodic acid are heated to boiling with a small quantity of red phosphorus for 35 minutes in a current of hydrogen. 1,3-dimethyl-2-(γ-phenyl-alkyl) -6,7-dioxy-1,2,3,4-tetrahydroisoquinoline hydriodide of the formula:

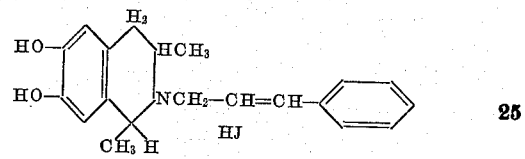

is thereby obtained. This was not isolated as such, but after removal of the hydriodic acid was identified by its hydrochloride. After crystallisation from methanol-ethyl acetate and finally from acetone it melts somewhat indefinitely at 160–163° C.

12. In like manner there is finally obtained by heating 1.22 gms. of 1-(n-heptyl)-2-(γ-phenylpropyl)-3-methyl-6,7-dimethoxy-1,2,3,4 - tetrahydroisoquinoline hydrochloride for 1½ hours with 8 ccs. of constant boiling hydriodic acid 1-(n-heptyl)-2-(γ-phenylpropyl)-3-methyl-6,7-dioxy-1,2,3,4-tetrahydroisoquinoline hydrochloride of the formula:

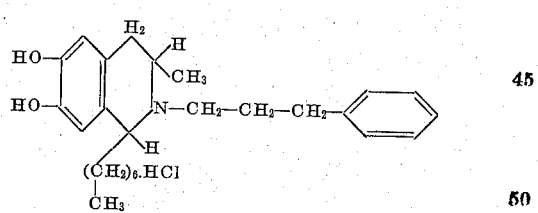

In the claims, the structural representation

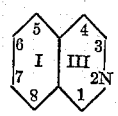

represents the isoquinoline, dihydroisoquinoline and the tetrahydroisoquinoline ring structures.

What we claim is:

1. As new compounds, 1,3-dimethyl-2-(γ-phenyl-propyl)-6,7-dioxy-tetrahydroisoquinoline having the formula

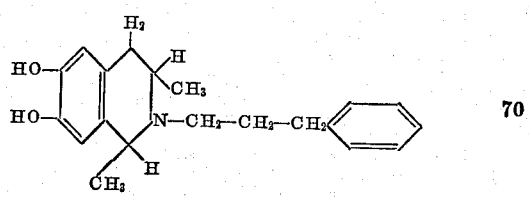

and its salts.

2. As new compounds, 1,3-dimethyl-2-(γ-phenyl - allyl) - 6,7 - dioxy - 1,2,3,4 - tetrahydroisoquinoline having the formula

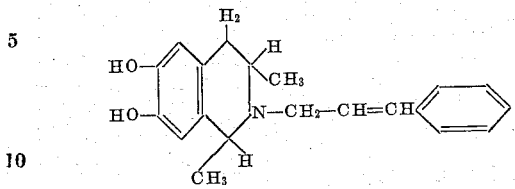

and its salts.

3. As new compounds 1(β-phenyl-ethyl)-6,7-dioxy 1,2,3,4-tetrahydro-isoquinoline and its salts.

4. As new compounds isoquinoline derivatives of the general formula

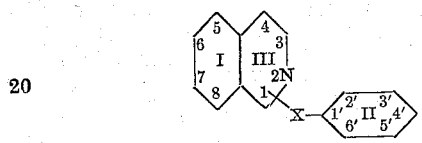

wherein the radical

is linked to the isoquinoline nucleus in a position selected from the group consisting of 1 and 2, X is a bivalent hydrocarbon radical selected from the group consisting of lower alkyl and lower alkylene radicals wherein only one of the benzene rings I and II contains at least two substituent free hydroxy groups and wherein the remaining atoms of these rings and of the nitrogen ring III in positions 1 through 8 and 2' through 6' have at least one substituent radical selected from the group consisting of hydrogen, alkyl and alkylene radicals, but having no other substituents, and their salts.

5. Isoquinoline derivatives in accordance with claim 4 wherein the two free hydroxy groups are in ortho position with respect to each other.

6. As new compounds isoquinoline derivatives of the general formula

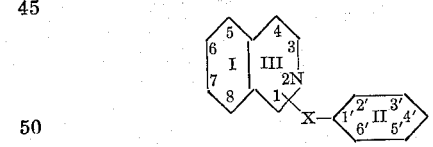

wherein the radical

is linked to the isoquinoline nucleus in a position selected from the group consisting of 1 and 2, X is a bivalent hydrocarbon radical containing at least two carbon atoms selected from the group consisting of lower alkyl and lower alkylene radicals, wherein only one of the benzene rings I and II contains at least two substituent free hydroxy groups and wherein the remaining atoms of these rings and of the nitrogen ring III in positions 1 through 8 and 2' through 6' have at least one substituent radical selected from the group consisting of hydrogen, alkyl and alkylene radicals, but having no other substituents, and their salts.

7. As new compounds, tetrahydroisoquinoline derivatives of the general formula

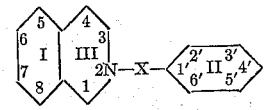

wherein X is a lower bivalent alkyl hydrocarbon radical, wherein the nitrogen containing ring III is tetrahydrogenated, wherein only one of the benzene rings I and II contains at least two free hydroxy groups and wherein the remaining atoms of these rings and of the nitrogen ring III in positions 1 and 3 through 8 and 2' through 6' have at least one substituent radical selected from the group consisting of hydrogen, alkyl and alkylene radicals, but having no other substituents, and their salts.

8. As new compounds, isoquinoline derivatives of the general formula

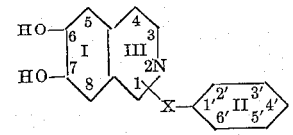

wherein the radical

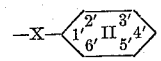

is linked to the isoquinoline nucleus in a position selected from the group consisting of 1 and 2, X is a bivalent hydrocarbon radical selected from the group consisting of lower alkyl and lower alkylene radicals and wherein the remaining atoms of the nitrogen ring in positions 1 through 4 have at least one substituent radical selected from the group consisting of hydrogen, alkyl and alkylene radicals and the remaining atoms of the benzene rings I and II in positions 5 and 8 and 2' through 6' have a substituent hydrogen radical, but having no other substituents, and their salts.

FRITZ KULZ.
CARL AUGUST HORNUNG.